United States Patent
Joh

(10) Patent No.: US 6,526,467 B1
(45) Date of Patent: Feb. 25, 2003

(54) APPARATUS AND METHOD FOR INTER-PROCESSOR COMMUNICATING IN SWITCH

(75) Inventor: Yong-In Joh, Kunpo (KR)

(73) Assignee: LG Information & Communications, Ltd., Seoul (KR)

( * ) Notice: Subject to any disclaimer, the term of this patent is extended or adjusted under 35 U.S.C. 154(b) by 0 days.

(21) Appl. No.: 09/342,909

(22) Filed: Jun. 30, 1999

(30) Foreign Application Priority Data

Sep. 3, 1998 (KR) .............................. 98-36684

(51) Int. Cl.$^7$ .............................................. G06F 13/00
(52) U.S. Cl. ........................................ 710/305; 370/412
(58) Field of Search ................................. 370/412, 424, 370/425, 428; 710/100, 305, 317

(56) References Cited

U.S. PATENT DOCUMENTS

| | | | | |
|---|---|---|---|---|
| 5,412,656 A | * | 5/1995 | Brand et al. ................. | 370/428 |
| 5,546,385 A | * | 8/1996 | Caspi et al. ................. | 370/412 |
| 6,219,353 B1 | * | 4/2001 | Wight et al. ................. | 370/425 |
| 6,330,245 B1 | * | 12/2001 | Brewer et al. ............... | 370/424 |

* cited by examiner

Primary Examiner—Glenn A. Auve
(74) Attorney, Agent, or Firm—Fleshner & Kim, LLP

(57) ABSTRACT

The present invention relates to a communication apparatus between processors for a switch and a method of the same which are capable of controlling a communication among a plurality of processors by providing a hub circuit at a switch. In a communication system which includes a plurality of processors, a buffer for receiving and transmitting a control signal or a data from/to the processors, a controller for controlling the data transmissions of the processors, and an error detection unit for detecting whether an error occurs at the processor, a communication method between processors for a switch includes a processor, which has a data to be transmitted, among a plurality of processors transmits a first control signal to the buffer, a step in which the error detection unit detects whether an error occurs at a processor which generates the first control signal and informs the controller of a result of the detection, a step in which the controller transmits the first control signal based on a certain arbitration method, selects one processor among a plurality of the processors which do not have an error, and transmits a second control signal to a corresponding processor, and a step in which a corresponding processor which receives the second control signal from the controller transmits a transmission data and clock signal.

18 Claims, 6 Drawing Sheets

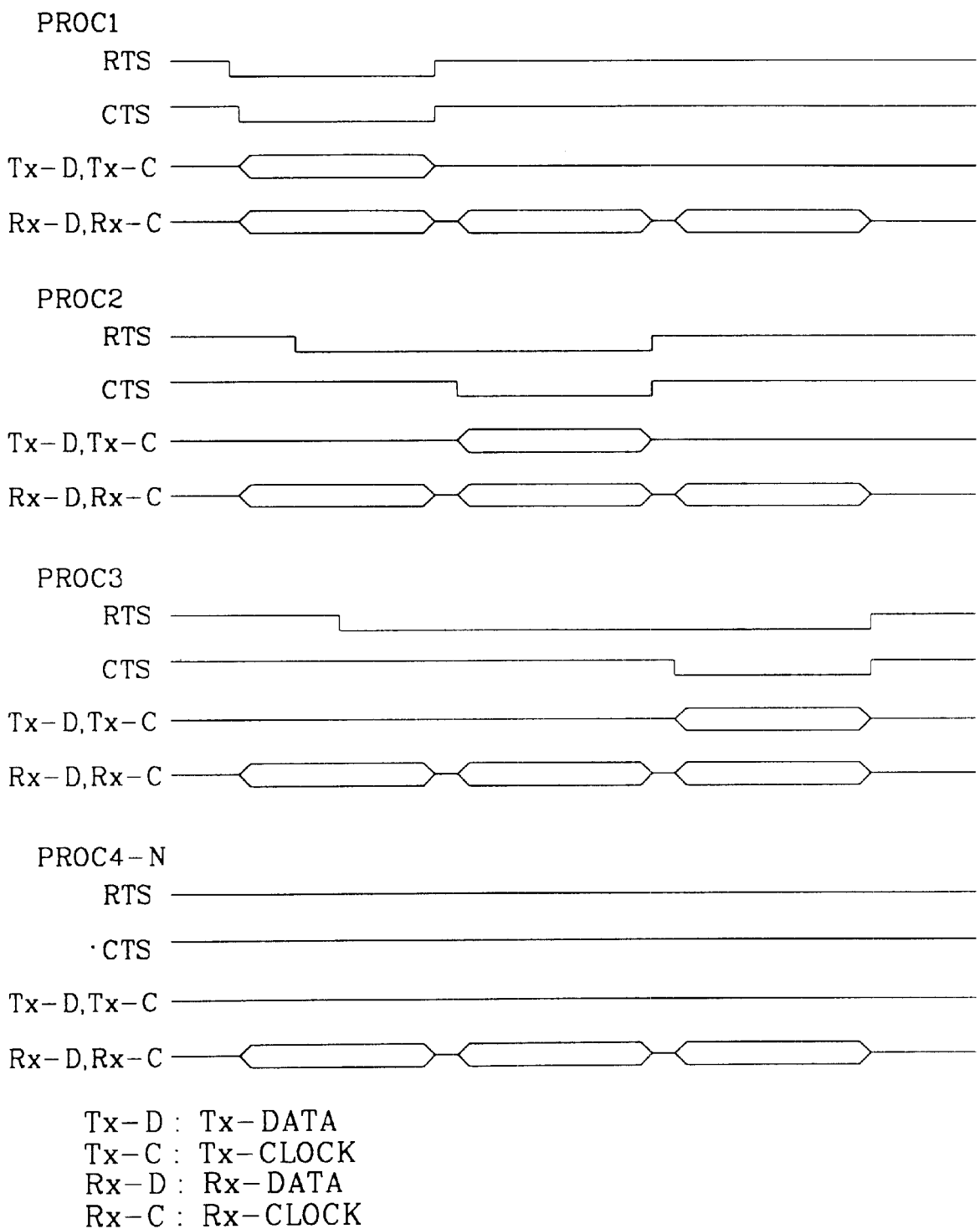

APPARATUS AND METHOD FOR INTER-PROCESSOR COMMUNICATING IN SWITCH

BACKGROUND OF THE INVENTION

1. Field of the Invention

The present invention relates to a communication between processors for a switch, and in particular to a communication apparatus between processors for a switch and a method of the same which are implemented based on a hub method.

2. Description of the Background Art

FIG. 1 is a view schematically illustrating the blocks for a communication between processors in order to explain a communication method between the processors in a conventional switch. As shown therein, the conventional switch formed of a plurality of processors 1~n includes one master processor Proc1(1), and a plurality of slave processors Proc2~ProcN(2~n), which are connected in a multi-drop type.

The master processor 1 and the slave processors 1~n perform a communication between processors based on a method which is directed to occupy a certain serial BUS and transmit a data based on a Round Robin method. Here, the master processor 1 includes a synchronous signal generator 10 for generating a frame synchronous signal FRS and a counter synchronous clock signal ASTCLK, and a BUS controller 20-1 for controlling a BUS. The slave processors 2~n include bus controllers 20-2~20-n for controlling the BUS.

FIG. 2 is a block diagram illustrating a detailed construction of the synchronous signal generator 10 of the master processor 1. As shown therein, the synchronous signal generator 10 includes a counter circuit 11 for providing 32 times bus occupancies and generating a frame synchronous signal FRS which is a reference signal for initializing a local counter of each processor, a clock signal generator 13 for generating a 1.25 MHz clock signal, and a buffer circuit 12 for generating a counter synchronous clock signal ASTCLK for synchronizing the local counter of each processor in accordance with a clock signal generated by the clock generator 13.

In addition, FIG. 3 is a block diagram illustrating the BUS controllers 20-1~20-n provided at each processor 1~n. As shown therein, the BUS controllers 20-1~20-n each include a counter circuit 21 for an inherent arbitration address AA[6:0] in accordance with a frame synchronous signal FRS applied from the synchronous signal generator 10, a counter synchronous clock signal ASTCLK, and a bus occupancy signal AST applied from other processors, a control circuit 22 for exchanging a data transmission request signal RTS and a data transmission verification signal CTS with a communication chip (not shown) and generating a bus occupancy signal AST for informing to other processors when the same occupied the BUS, and a buffer circuit 23 for transmitting and receiving a data and clock signal TxData, TxCLK/RxData, RxCLK outputted from the communication chip (not shown) to/from other processors by synchronizing to a certain clock signal BRCLK via the BUS.

FIG. 4 is waveforms of the signals FRS, ASTCLK, AST, BRCLK and DATA.

The communication between processors at a conventional switch will be explained with reference to the accompanying drawings.

First, the synchronous signal generator 10 of the master processor 1 supplies a frame synchronous signal FRS and a counter synchronous clock signal ASTCLK which are used for an arbitration at each processor, to the BUS controllers 20-1~20-n of the processors 2~n via the BUS.

The processors 1~n connected via the BUS initializes the counter circuit 21 based on an arbitration address value AA[6:0] given when mounting a system when the frame synchronous signal FRS is activated.

In the case that the bus occupancy signal AST is in an inactivation state, namely, no processors occupy the bus, the processors 1~n operate a corresponding counter circuit 21 in accordance with a counter synchronous signal ASTCLK applied from the BUS controller 20-1 of the master processor 1 and counts up its arbitration address value AA[6:0]. In the case that the bus occupancy signal AST is in an activation state, namely, other processors occupy the bus, the counting operation is stopped.

For example, the operation that the third processor 3 transmits data will be explained.

The counter circuit 21 of the BUS controller 20-3 of the processor 3 counts up the arbitration address value AA[6:0] which is given when the bus occupancy signal AST is in an inactivation state on the BUS. When the count value reaches a certain value(which is set to have a bus occupancy right), when there is a data transfer request(RTS: Request To Send) from a communication chip(not shown), the control circuit 22 of the processor 3 activates the bus occupancy signal AST for thereby informing other processors of that the control circuit 22 occupies the bus.

In this case, other processors stop the counting operation. The buffer circuit 23 of the processor 3 transmits a transmission data TxData and a transmission clock signal TxCLK from the communication chip(not shown) to a certain destination via the BUS.

When the data transmission is completed, the processor 3 inactivates the bus occupancy signal AST, and then the counter circuits 21 of each processor begin to count.

When the count value reaches a certain value, the processor has a bus use right, and the processor having the bus use right activates the bus occupancy signal AST in the case that there are data to be transmitted and transmits itself data to a certain destination.

The above-described operation is performed by a certain number. For example, 32 times bus occupancy rights are given, and the synchronous signal generator 10 of the master processor 1 generates a frame synchronous signal FRS and initializes the local counter 21. The above-described operation is repeatedly performed.

In the above-described communication method between the processors of the conventional switch, since all processors are connected via one communication line, if an error occurs in one of a plurality of processors, a critical problem occurs in the entire communication system. In particular, when mounting and unmounting the processors, the communication of the previously installed processors may be affected, so that the contents of the communication is damaged.

In addition, since the signals for implementing a synchronization between processors are distributed, a malfunction may occur. Since the arbitration address is manually set in a back plane when installing the system, the arbitration address may be erroneously recognized due to a certain small error or a contact error.

SUMMARY OF THE INVENTION

Accordingly, it is an object to provide a communication apparatus between processors of a switch and a method of the same which are capable of implementing an accurate communication among a plurality of processors by providing a hub circuit at a switch for overcoming the problems which are encountered in the conventional art.

To achieve the above object, there is provided a communication method between processors for a switch which includes a step in which a processor, which has a data to be transmitted, among a plurality of processors transmits a first control signal to the buffer, a step in which the error detection unit detects whether an error occurs at a processor which generates the first control signal and informs the controller of a result of the detection, a step in which the controller transmits the first control signal based on a certain arbitration method, selects one processor among a plurality of the processors which do not have an error, and transmits a second control signal to a corresponding processor, a step in which a corresponding processor which receives the second control signal from the controller transmits a transmission data and clock signal, a step in which the error detection unit detects whether an error occurs at the processor which transmits the data and informs the controller of a result of the detection, a step in which, when an error occurs, the controller stops a data transmission of a corresponding processor, a step in which, when an error is not occurred, a corresponding processor which finished to transmit the data, releases the first control signal, and a step in which the data transmission is completed by releasing the second control signal applied to the processor, wherein a communication system includes a plurality of processors, a buffer for receiving and transmitting a control signal or a data from/to the processors, a controller for controlling the data transmissions of the processors, and an error detection unit for detecting whether an error occurs at the processor.

Additional advantages, objects and features of the invention will become more apparent from the description which follows.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 8 is a wave form diagram illustrating a process that a plurality of processors sequentially transfer data in accordance with a control of a hub circuit according to the present invention.

DETAILED DESCRIPTION OF THE PREFERRED EMBODIMENTS

The embodiments of the present invention will be explained with reference to the accompanying drawings.

Figure 1:
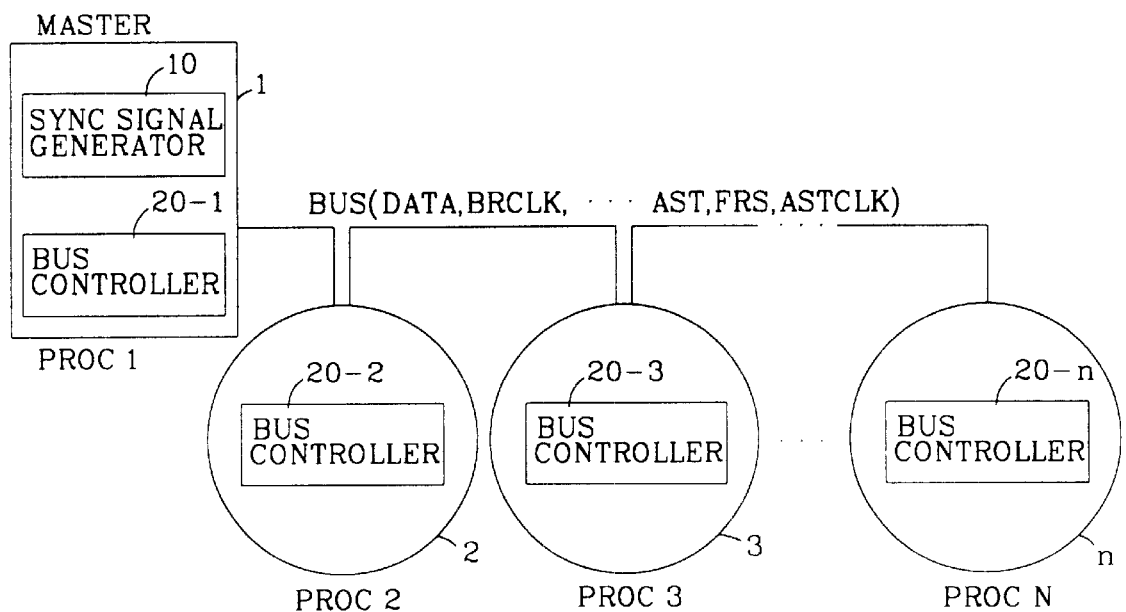
FIG. 1 is a block diagram illustrating a conventional communication apparatus between processors for a switch.
Figure 2:
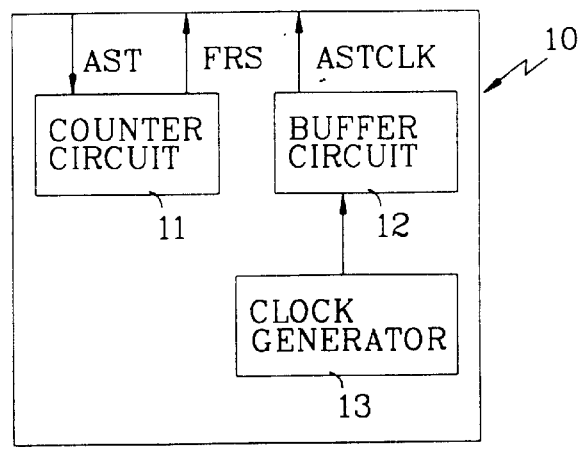
FIG. 2 is a block diagram illustrating a synchronous signal generator of FIG. 1.
Figure 3:
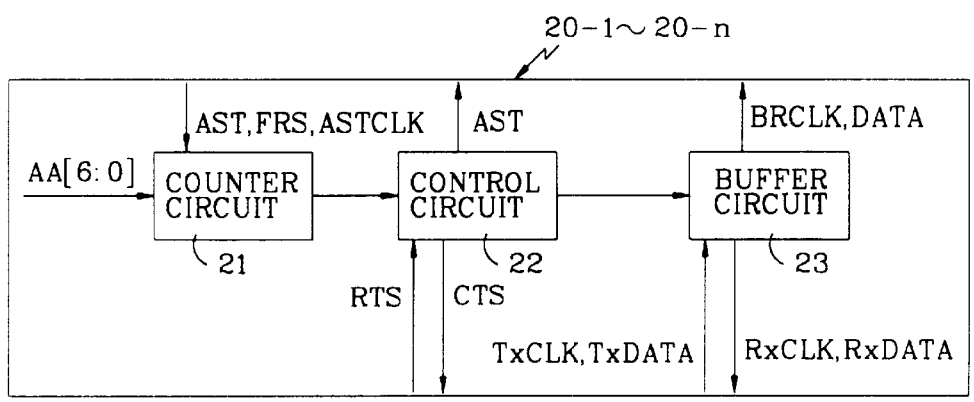
FIG. 3 is a block diagram illustrating bus controllers 20-1~20-n of FIG. 1.
Figure 4:
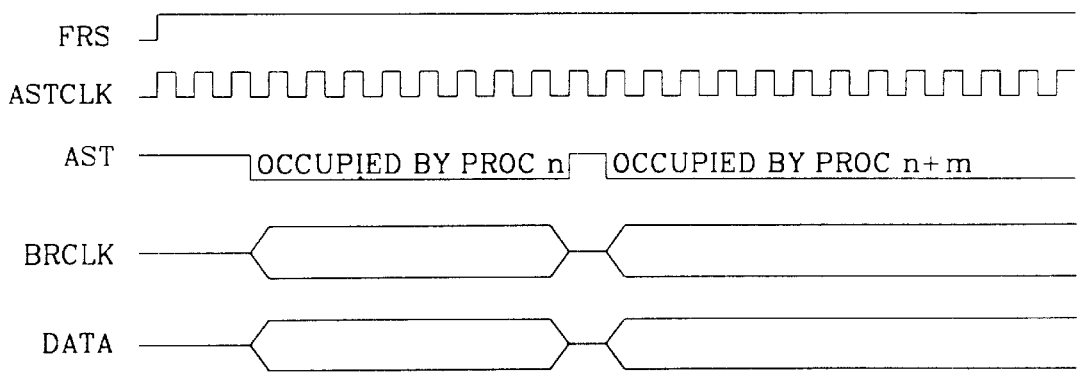
FIG. 4 is a wave form diagrams illustrating timing of signals FRS, ASTCLK, AST, BRCLK, and DATA.
Figure 5:
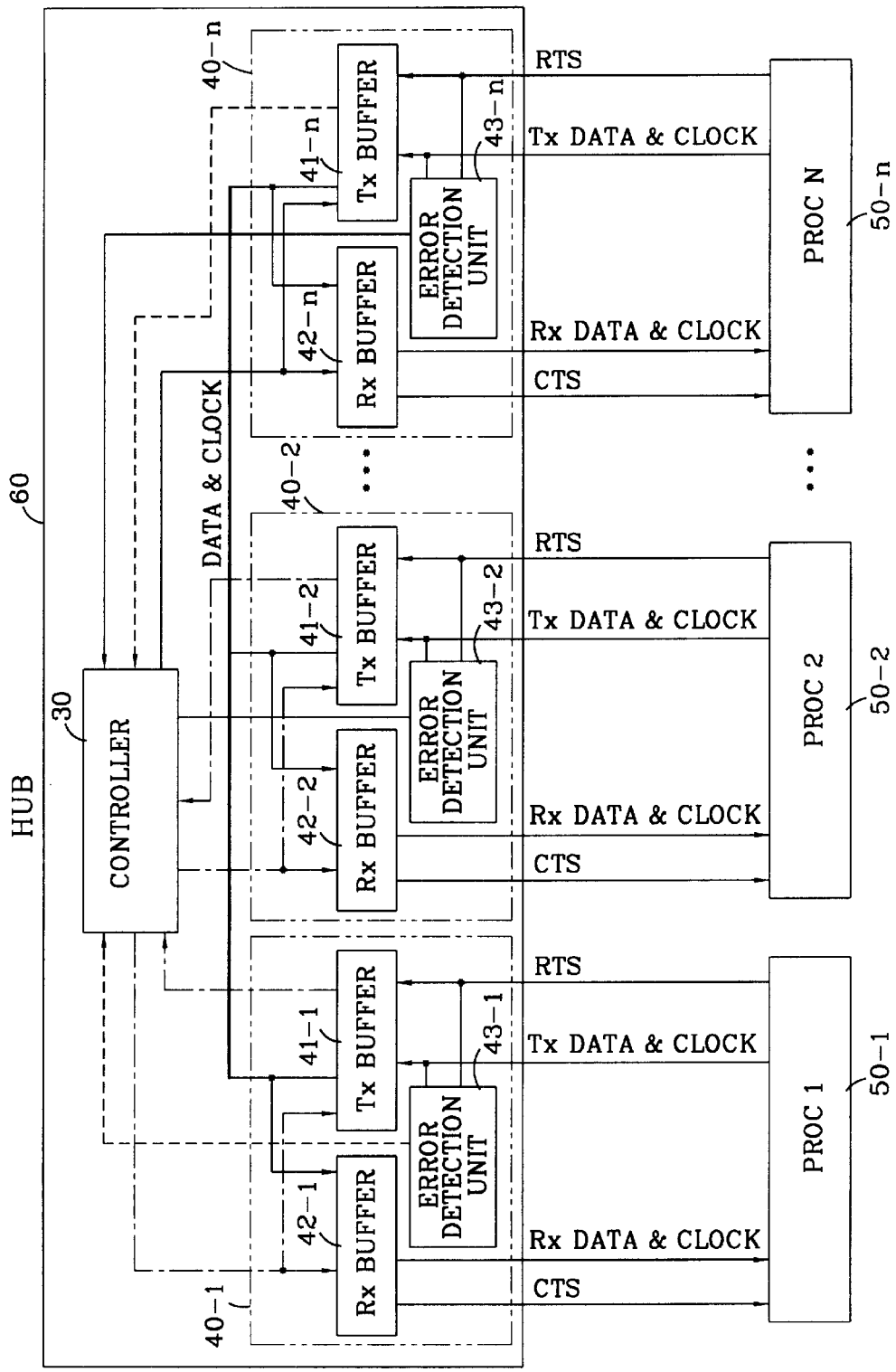
FIG. 5 is a block diagram illustrating a communication apparatus between processors for a switch according to the present invention.

FIG. 5 is a block diagram illustrating a communication apparatus between processors of a switch which is implemented by a hub method according to the present invention. The communication apparatus according to the present invention includes a hub circuit 60 which implements an arbitration of a bus occupancy with respect to a plurality of data transfer requests, and a plurality of processors 50-1~50-n which perform a data transmission/receiving operation in accordance with a control of the hub circuit 60.

The hub circuit 60 includes a plurality of buffers 40-1~40-n corresponding to the processors 50-1~50-n for transmitting the signals to/from the processors 50-1~50-n, and a controller 30 for controlling the data transfer of the processors 50-1~50-n.

The buffers 40-1~40-n include transmission buffers 41-1~41-n for receiving a data transmission request signal (Reqyest To Send: RTS), a transmission data, and a clock signal TxData & Clock), receiving buffers (Rx buffer) 42-1~42~n for receiving a data transmission permission signal (Clear To Send: CTS) from the controller 30, and a data and clock signal (Data & Clock) transmitted from other processors and transmitting the receiving data and clock signal (RxData & Clock) to a corresponding processor, and error detection units 43-1~43-n for judging an error occurrence by detecting the frequency or transmission time of the signals transmitted to the transmission buffers 41-1~41-n and applying a result of the judgement to the controller 30.

Figure 6:
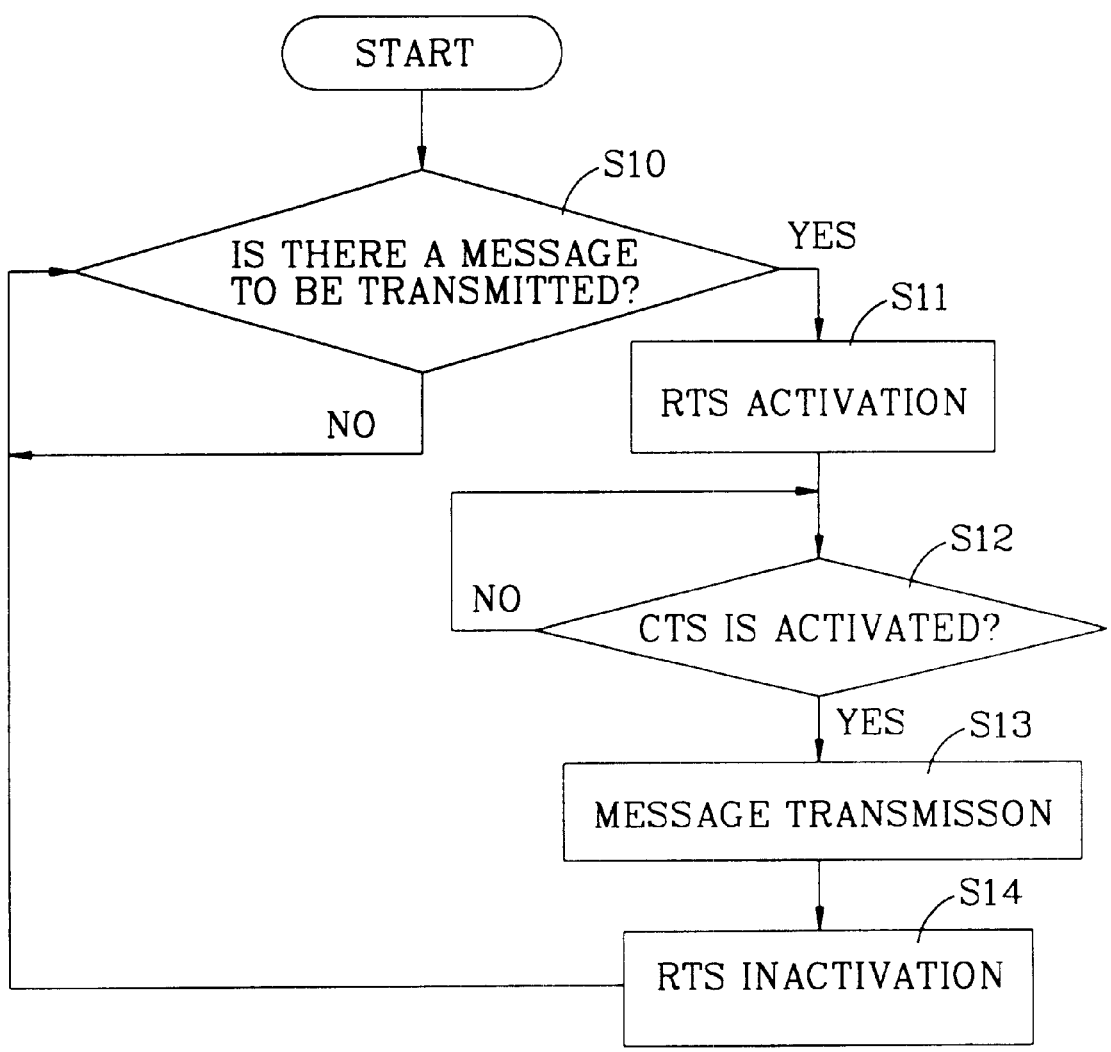
FIG. 6 is a flow chart illustrating a data transfer process at each processor according to the present invention.
Figure 7:
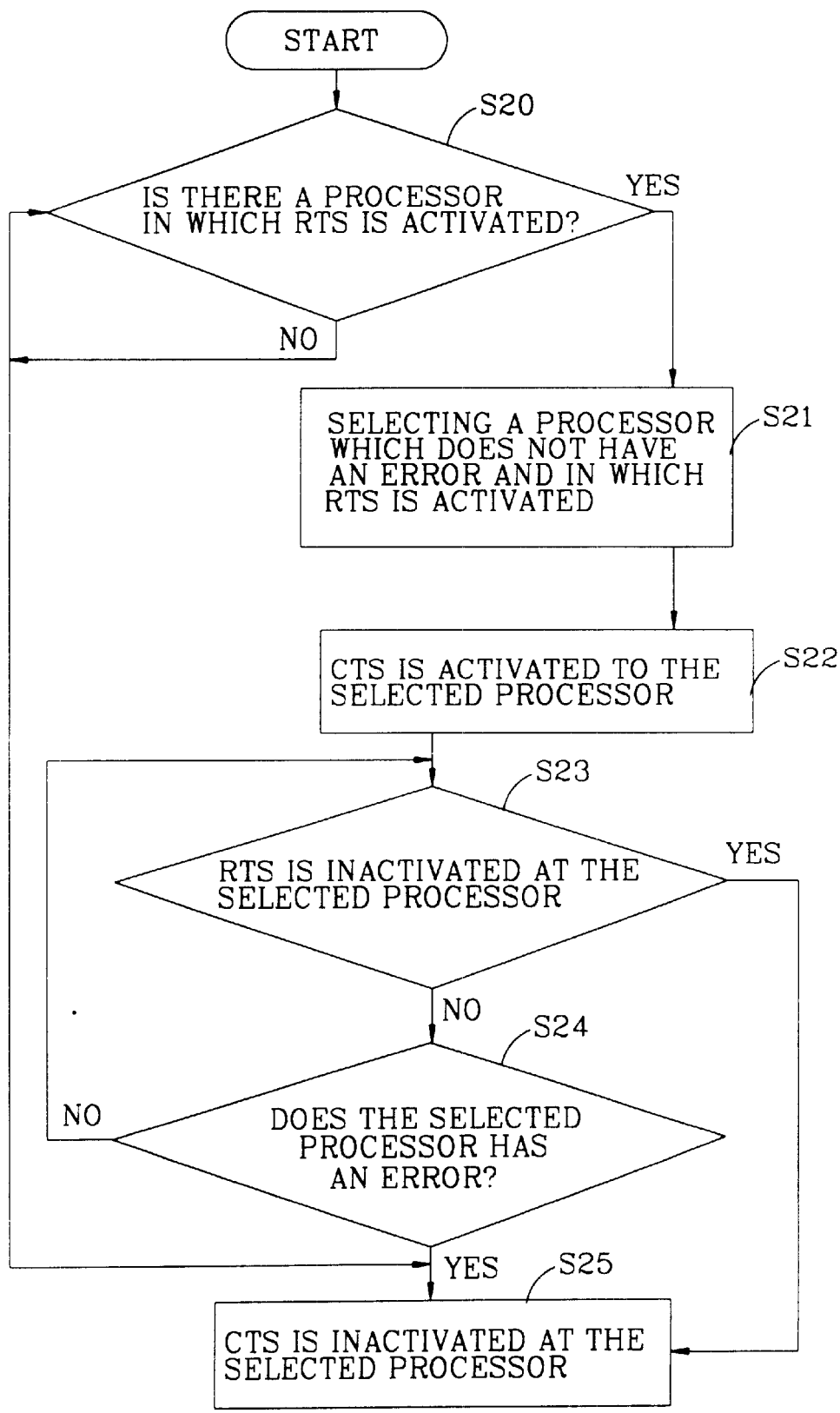
FIG. 7 is a flow chart illustrating a method for controlling a data transfer between processors at a hub circuit side according to the present invention.

FIG. 6 is a flow chart illustrating a data transmission process at each of the processors 50-1~50-n according to the present invention, and FIG. 7 is a flow chart illustrating a process that the data transmissions of the processors 50-1~50-n are controlled at the side of the hub circuit 60 according to the present invention.

FIG. 8 is a wave form diagram of signals in order to explain a process that a data is transmitted from each process according to the present invention.

The operation of the communication between processors of a switch according to the present invention will be explained with reference to the accompanying drawings.

First, the processors among the processors 50-1~50-n, which have data to be transmitted activate a data transmission request signal RTS and apply the activated signal RTS to the transmission buffers 41-1~41-n corresponding to the hub circuit 60.

A corresponding one of the error detection units 43-1~43-n detects the data transmission request signal RTS and informs an error occurrence state to the controller 30.

The controller 30 which receives a plurality of data transmission signals selects one processor among the multiple processors, which requests a data transmission and does not have an error in accordance with a certain program and transmits a control signal which permits a data transmission to a corresponding one of the buffers 40-1~40-n.

At this time, the controller 30 may be variously implemented based on an arbitration method which corresponds to each system, for example, a Round-robin method, a Priority method, a FIFO(First-In First-Out) method, etc. using an ASIC(Application Specific Integrated Circuit), FPGA(Field Programmable Gate Array), EPLD(Erasable Programmable Logic Device), etc.

The receiving buffers 42-1~42~n which have a data transmission permission from the controller 30 transmit a data transmission permission signal CTS to the processors 50-1~50-n, and the processors 50-1~50-n transmit the transmission data and clock signal TxData & Clock to the transmission buffers 41-1~41~n of the buffers 40-1~40-n.

At this time, the error detection units 43-1~43-n detects the transmitted transmission data TxData & Clock and judges an error in the case that when the clock signal exceeds a certain frequency range or a data transmission time exceeds the previously set maximum data transmission time for thereby informing the error state to the controller 30.

The controller 30 controls a corresponding one of the buffers 40-1~40-n so that the processor having an error stops a data transmission operation.

When the data transmission is normally completed without an error occurrence, the processors 50-1~50-n which finished the data transmission inactivate the data transmission request signal RTS and informs the hub circuit 60 of that the data transmission is completed.

The controller 30 releases the data transmission permission signal transmitted to the processor, selects a processor which has the priority among the multiple processors, and permits a data transmission.

The above-described operation is repeatedly performed, so that a data transmission is implemented among a plurality of processors.

FIG. 6 is a flow chart illustrating a data transmission process at the side of the processors 50-1~50-n. The data transmission process at the side of the processors will be explained with reference to FIG. 6.

A communication chip of each of the processors 50-1~50-n judges whether there is a data which is first transmitted in Step S10 and activates a data transmission request signal RTS in Step S11 if there is a data to be transmitted.

Thereafter, it is judged whether the data transmission signal CTS is activated in Step S12. If the CTS signal is activated, the transmission of the data is started at the time when the CTS signal is activated in Step S13.

When the data transmission is completed, the RTS signal is inactivated, so that the data transmission process is completed in Step S14. FIG. 7 is a flow chart illustrating a data transmission control method of the processors 50-1~50-n at the side of the hub circuit 60.

As shown therein, at the controller 30 of the hub circuit 60, it is judged whether there is a processor in which the data transmission request signal RTS is activated in Step S20. One processor is selected among the processors in which the RTS signal is activated and there is not a RTS signal error in Step S21. At this time, in order to select one processor, the controller 30 may be programmed based on a round-robin method, a priority method, a FIFO method, and etc.

The controller 30 activates the data transmission permission signal CTS at the selected processor in Step S22, so that the processor in which the CTS signal is activated starts a data transmission.

The controller 30 judges whether the RTS signal is inactivated at the processor in Step S23 and detects whether an error occurs during the data transmission at the processor in Step S24.

If the RTS signal is inactivated, or an error occurs at the processor which is transmitting a data, the CTS signal of the processor is inactivated, and the data transmission is completed with respect to the processor in Step S25, and the routine is returned to the initial step S20, so that the steps S20~S25 are repeatedly performed.

FIG. 8 is a wave form diagram illustrating a data transmission by a plurality of processors based on the above-described operation. The processors Proc 1~Proc N sequentially transmit the data based on the round-robin method. In FIG. 8, the case that the first through third processors Proc 1~Proc 3 transmit the data is explained.

As shown in FIG. 8, when the RTS signal is activated by the first through third processors Proc 1~Proc 3, the controller 30 of the hub circuit 60 activates the CTS signal to the first processor Proc 1 based on the priority.

The first processor Proc 1 drives the transmission data Tx_D and the transmission clock signal Tx_C and transmits the same to a certain destination.

When the data transmission is completed, the first processor Proc 1 inactivates the RTS signal, and the controller 30 inactivates the CTS signal of the first processor Proc 1.

Thereafter, the controller 30 activates the CTS signal to the second processor Proc 2 having the next priority for thereby implementing a data transmission of the second processor Proc 2. The data transmission of the third processor Proc 3 is performed in the same manner.

There are no signal changes in the processors Proc 3~N which do not have the data to be transmitted. Since the receiving buffers of the processors Proc 1~Proc N are open, the receiving data Rx_D and receiving clock signal Rx_C may be received irrespective of the RTS or CTS signal.

In the present invention, as a control signal for the data transmission, a data transmission request signal RTS and a data transmission permission signal CTS which are generally used for a MODEM, are used, in a plurality of the processors, a serial communication chip having a known serial I/O port is used without adding additional circuit.

Since the controller 30 of the hub circuit 60 is simply implemented by ASIC, FPGA, EPLD, etc., the arbitration method may be easily changed without changing the circuit. In addition, since the buffers 40-1~40-2 are formed of a known buffer chip, the construction of the circuit is simple.

Since each processor is operated in accordance with a control of the hub circuit, a communication between other processors is not affected when mounting/unmounting any type of processors.

The arbitration time of the controller 30 corresponds to a gate delay time of the ASIC, FPGA, and EPLD, the arbitration time is decreased, and the transmission speed of the message is increased compared to the bus method.

A dual type system in which two hub circuits are operated in an active or standby mode are may be implemented by additionally installing the hub circuit.

As described above, the present invention may be adapted to various application products which need a high speed communication at a large capacity full electronic switching system or between processors or may be adapted to a product which does not use a collision detection method due to a frequent message communication.

Although the preferred embodiment of the present invention have been disclosed for illustrative purposes, those skilled in the art will appreciate that various modifications, additions and substitutions are possible, without departing from the scope and spirit of the invention as recited in the accompanying claims.

What is claimed is:

1. A switching apparatus for a multi-processor communication system, comprising:
   a hub circuit which arbitrates a data transmission with respect to a plurality of data transmission requests; and
   a plurality of processors for transmitting a first control signal to the hub circuit when there is a data to be transmitted and performing a transmission of a data when a second control signal is applied from the hub circuit, wherein the hub circuit includes a plurality of buffers corresponding to the plurality of processors for receiving and transmitting a control signal and data from and to each processor, and a controller for controlling a data transmission of the plurality of processors based on a certain arbitration method.

2. The apparatus of claim 1, wherein said controller is implemented by an ASIC (Application Specific Integrated Circuit), a FPGA (Field Programmable Gate Array), or an EPLD (Erasable Programmable Logic Device).

3. The apparatus of claim 1, wherein each buffer comprises:

a transmission buffer for receiving a first control signal or a transmission data and a clock signal from a corresponding processor and transmitting the received signal to the controller or other processors; and a receiving buffer for receiving a second control signal from the controller and a data and clock signal from other processors and transmitting the received data and signals to a corresponding processor.

4. The apparatus of claim 3, further comprising:

an error detection unit for detecting a signal transmitted to the transmission buffet, determining whether an error occurs, and applying a result of the determination to the controller.

5. The apparatus of claim 4, wherein said error detection unit determines that an error has occurred if the clock signal from the corresponding processor exceeds a certain frequency range.

6. The apparatus of claim 4, wherein said error detection unit determines that an error has occurred if a data transmission time of the corresponding processor exceeds a maximum transmission time.

7. The apparatus of claim 1, wherein said plurality of processors each comprises a serial I/O port for inputting/outputting a first and a second control signal and a transmission/receiving data therethrough.

8. The apparatus of claim 1, wherein said first and second control signals are a data transmission request signal and a data transmission permission signal which are the control signals used for a known MODEM.

9. The apparatus of claim 1, wherein two hub circuits are provided for thereby implementing a dual circuit system.

10. A switching method for a multi-processor communication system, comprising:

activating and transmitting a first control signal from a plurality of processors which have data to transmit;

selecting one of the plurality of processors by a hub circuit based on a certain arbitration method and transmitting a second control signal to the selected processor from the hub circuit;

transmitting a transmission data from the selected processor which received the second control signal in synchronization with a certain clock signal;

inactivating the first control signal by the selected processor which transmitted the transmission data; and inactivating the second control signal applied to the selected processor by the hub circuit.

11. The method of claim 10, further comprising:

detecting whether an error occurs at the selected processor which transmits the data; and stopping data transmission of the selected processor in case an error is detected in the detecting step.

12. The method of claim 11, wherein said error detection is implemented based on whether a clock signal from the selected processor exceeds a certain frequency range.

13. The method of claim 11, wherein said error detection is implemented based on whether a data transmission time at the selected processor exceeds a maximum transmission time.

14. The method of claim 10, wherein said switching method is variously implemented based on a system environment.

15. The method of claim 10, wherein the first and second control signals are a data transmission request signal and a data transmission permission signal which are control signals used for MODEM.

16. A switching method for a multi-processor communication system, comprising:

transmitting a first control signal from a plurality of the processors which have data to transmit;

detecting whether an error occurs at one of said plurality of processors which transmitted the first control signal and informing a controller of a result of the detection;

selecting one of said plurality of processors which does not have an error based on a certain arbitration method and transmitting a second control signal to the selected processor;

transmitting a transmission data and clock signal from the selected processor which received the second control signal from the controller;

detecting whether an error occurs at the selected processor during transmission of the transmission data and informing the controller of a result of the detection;

terminating the data transmission of the selected processor by the controller when the error is detected;

finishing the data transmission of the selected processor and releasing the first control signal when an error is not detected; and when the data transmission is completed, releasing the second control signal applied to the selected processor.

17. The method of claim 16, wherein said certain arbitration method of the controller is implemented based on an ASIC (Application Specific Integrated Circuit), a FPGA (Field Programmable Gate Array), or an EPLD (Erasable Programmable Logic Device) and is variously implemented based on a system environment.

18. The method of claim 16, wherein the first and second control signals are a data transmission request signal and a data transmission permission signal which are control signals used for a MODEM.

* * * * *